(12) United States Patent
Nomura et al.

(10) Patent No.: US 8,098,320 B2
(45) Date of Patent: Jan. 17, 2012

(54) IMAGING DEVICE

(75) Inventors: Hiroshi Nomura, Saitama (JP); Atsumi Kaneko, Tokyo (JP); Isao Okuda, Saitama (JP); Eijiroh Tada, Saitama (JP)

(73) Assignee: Hoya Corporation, Tokyo (JP)

( * ) Notice: Subject to any disclaimer, the term of this patent is extended or adjusted under 35 U.S.C. 154(b) by 426 days.

(21) Appl. No.: 12/266,799

(22) Filed: Nov. 7, 2008

(65) Prior Publication Data
US 2009/0122179 A1 May 14, 2009

(30) Foreign Application Priority Data
Nov. 13, 2007 (JP) .................................. 2007-294057

(51) Int. Cl.
*H04N 5/225* (2006.01)
(52) U.S. Cl. ......... 348/344; 348/335; 348/337; 348/343
(58) Field of Classification Search .................. 348/335, 348/337, 340, 343, 344, 360, 369, 267; 359/362, 359/678, 726, 733, 754, 833, 834, 850
See application file for complete search history.

(56) References Cited

U.S. PATENT DOCUMENTS

| | | | | |
|---|---|---|---|---|
| 3,612,764 | A * | 10/1971 | Gilkeson et al. | 348/156 |
| 6,850,279 | B1 * | 2/2005 | Scherling | 348/335 |
| 7,051,938 | B2 * | 5/2006 | Johnson et al. | 235/462.39 |
| 7,667,897 | B2 * | 2/2010 | Seo | 359/672 |
| 2004/0240052 | A1 | 12/2004 | Minefuji et al. | |
| 2005/0145772 | A1 | 7/2005 | Abe | |
| 2006/0017834 | A1 * | 1/2006 | Konno et al. | 348/335 |
| 2006/0132851 | A1 * | 6/2006 | Kim | 358/296 |
| 2008/0225139 | A1 | 9/2008 | Nomura et al. | |
| 2009/0005112 | A1 * | 1/2009 | Sorek et al. | 455/556.2 |
| 2009/0047995 | A1 * | 2/2009 | Futter et al. | 455/556.1 |

FOREIGN PATENT DOCUMENTS

JP  2007-116361  5/2007

OTHER PUBLICATIONS

English language Abstract of JP 2007-116361, May 10, 2007.
U.S. Appl. No. 12/191,578 to Nomura et al., filed Aug. 14, 2008.

* cited by examiner

*Primary Examiner* — Lin Ye
*Assistant Examiner* — Chriss Yoder, III
(74) *Attorney, Agent, or Firm* — Greenblum & Bernstein P.L.C.

(57) ABSTRACT

An imaging device includes a housing including first and second photographing apertures which are open toward opposite directions; an image pickup device provided in the housing; a main optical system forming incident light from the first photographing aperture onto an imaging surface of the image pickup device; and an insertable optical element movable between an insertion position in an optical path of a main optical system and a removed position out of the optical path of the main optical system, the insertable optical element constituting at least a part of a sub-optical system which forms incident light from the second photographing aperture onto the imaging surface when at the insertion position. When the insertable optical element is positioned in the insertion position, the sub-optical axis is offset from the main optical axis toward the removed position of the insertable optical element in the inserting/removing direction.

10 Claims, 13 Drawing Sheets

Fig.10
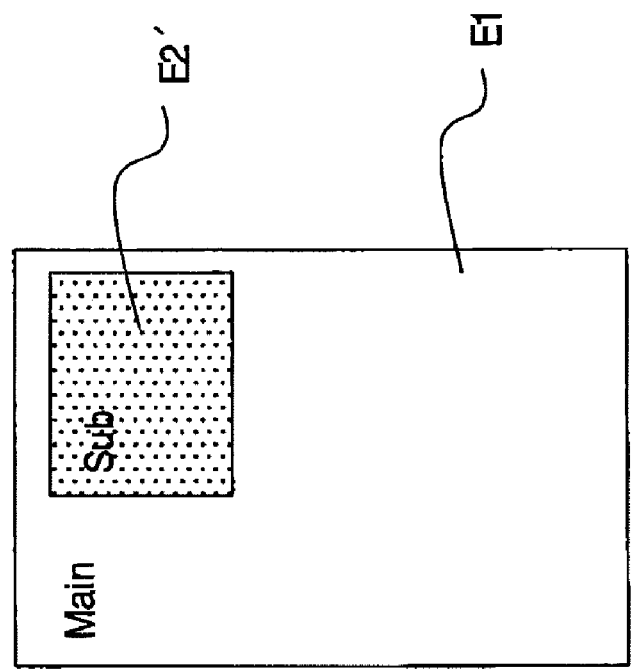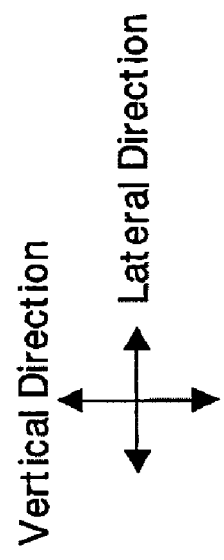
Fig.11
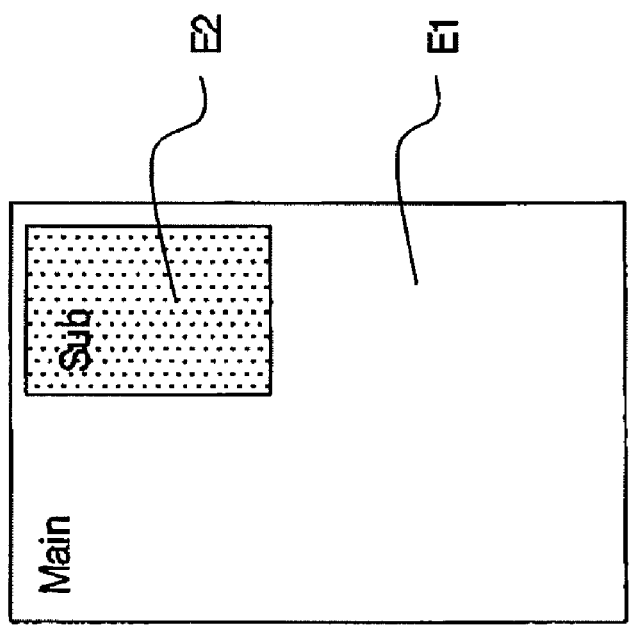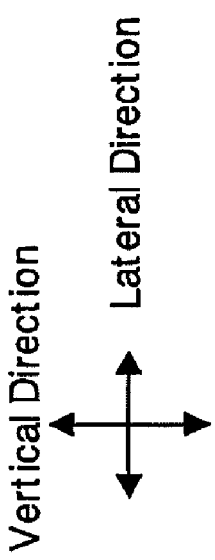

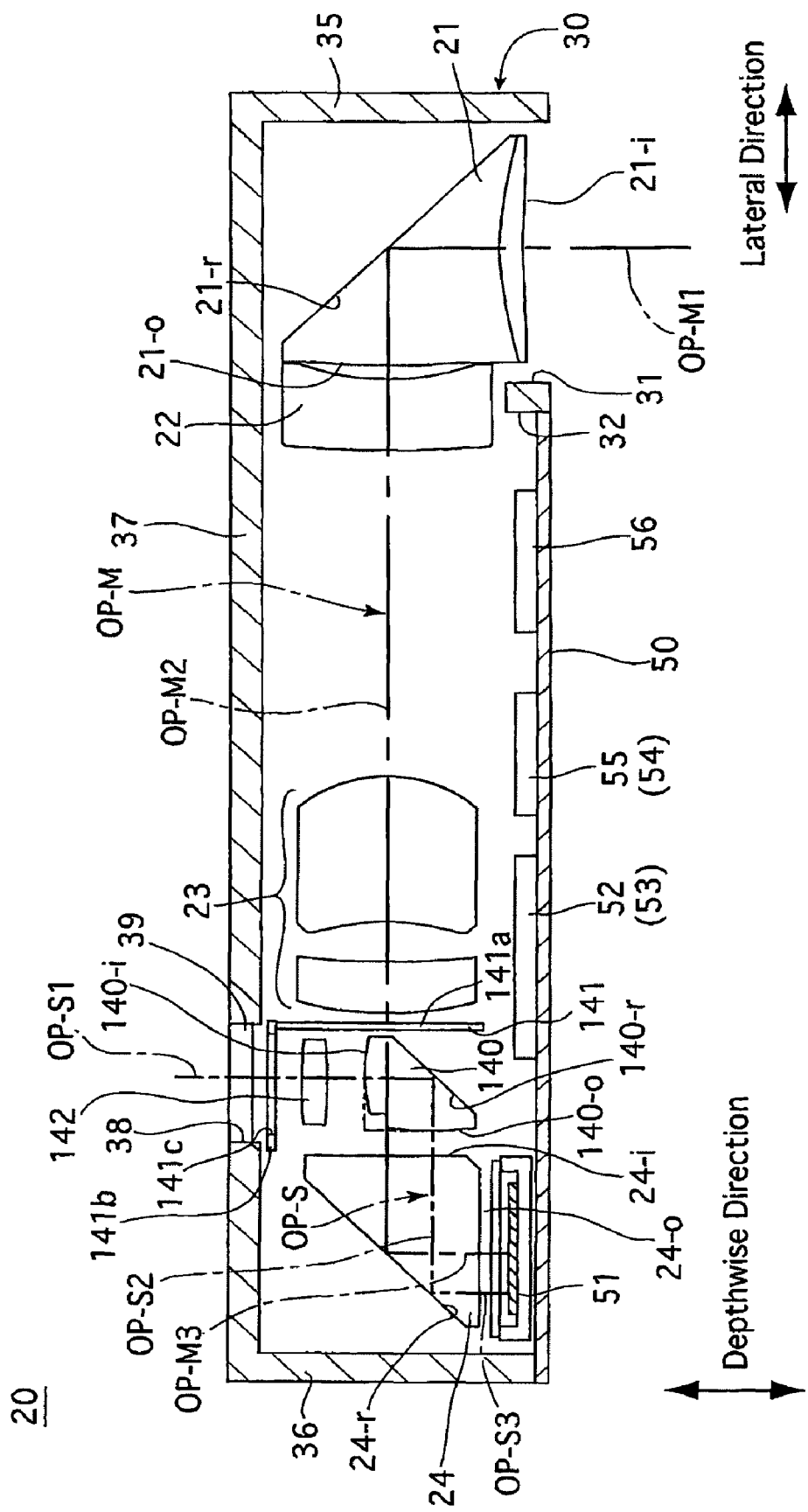

IMAGING DEVICE

BACKGROUND OF THE INVENTION

1. Field of the Invention

The present invention relates to an imaging device, more specifically to an imaging device incorporated in a mobile electronic device such as a mobile phone.

2. Description of the Related Art

In recent years, mobile electronic devices such as mobile phones with an inward-facing camera (sub-camera) in addition to an outward-facing camera (main camera) have been in widespread use. The outward-facing camera is used to capture still images or video clips of ordinary subjects while the inward-facing camera is used to capture still images or video clips of the user himself/herself for, e.g., video conferencing. If two separate imaging units are provided as the inward-facing camera and the outward-facing camera, respectively, the device which includes these cameras increases in size and the production cost of the device also increases. Accordingly, it has been desired to provide an imaging device which is equipped with the inward-facing camera and the outward-facing camera and which is structured to be capable of meeting the demand for miniaturization and cost reduction. For instance, Japanese Unexamined Patent Publication 2007-116361 has proposed an imaging device which is configured to be capable of selectively making light bundle that enters the imaging device from the front of the housing of the imaging device and another light bundle that enters the imaging device from the back of the housing incident on a single image pickup device via a linking-up of a reflector and a light-shielding member which are installed in the housing.

In the type of imaging device such as disclosed in the aforementioned Japanese Unexamined Patent Publication, in which the imaging direction (photographing direction) is switched between two different directions by inserting and removing an insertable optical element into and from an optical path, the insertable optical element is inserted into the target optical path up to the center (optical axis) thereof, and the central position of the image forming area on the imaging surface of the image pickup device does not substantially move regardless of whether or not the imaging direction is switched between the two different directions. Therefore, the amount of movement of the insertable optical element in the inserting/removing direction thereof has needed to be greater than at least the radius from the optical axis of the target light bundle traveling along the optical path. Nevertheless, due to the widespread use of mobile electronic devices, the demand for miniaturization of the imaging device has been increasingly growing.

SUMMARY OF THE INVENTION

The present invention provides an imaging device which can capture images of objects at opposite locations and can be made smaller in size than conventional imaging devices.

According to an aspect of the present invention an imaging device is provided, including a housing including a first photographing aperture and a second photographing aperture which are open toward opposite directions; an image pickup device provided in the housing; a main optical system which forms incident light from the first photographing aperture onto an imaging surface of the image pickup device, the main optical system defining a main optical axis extending from the first photographing aperture to the image pickup device; and an insertable optical element which is movable in an inserting/removing direction between an insertion position in an optical path of the main optical system and a removed position out of the optical path of the main optical system, wherein the insertable optical element constitutes at least a part of a sub-optical system which forms incident light from the second photographing aperture onto the imaging surface of the image pickup device when the insertable optical element is positioned at the insertion position, the sub-optical system defining a sub-optical axis extending from the second photographing aperture to the image pickup device via the insertable optical element. When the insertable optical element is positioned in the insertion position, the sub-optical axis is offset from the main optical axis toward the removed position of the insertable optical element in the inserting/removing direction.

It is desirable for the image pickup device to be mounted to a wall of the housing which includes the first photographing aperture, wherein the main optical system includes a first reflecting member which reflects the incident light from the first photographing aperture at a substantially right angle; and a second reflecting member which reflects the light reflected by the first reflecting member at a substantially right angle toward the image pickup device. The insertable optical element includes a third reflecting member which is inserted into and removed from an intermediate optical path of the main optical system between the first reflecting member and the second reflecting member, and the third reflecting member reflects the incident light from the second photographing aperture toward the second reflecting member when the third reflecting member is inserted in the intermediate optical path of the main optical system.

In this case, if the inserting/removing direction of the insertable optical element is orthogonal to a plane defined by an intermediate optical axis of the main optical axis that extends from the first reflecting member to the second reflecting member and an exit optical axis of the main optical that extends from the second reflecting member to be incident on the image pickup device, the housing can be slimmed in the forward/rearward direction.

In the imaging device according to the present invention, when a photographing operation is performed with the incident light via the first photographing aperture, with the insertable optical element being positioned in the removed position, it is desirable for a high-pixel-resolution photographing operation using a large area of the imaging surface of the image pickup device to be carried out. When a photographing operation is performed with the incident light via the second photographing aperture, with the insertable optical element being positioned in the insertion position, it is desirable for a low-pixel-resolution photographing operation using an area of the imaging surface of the image pickup device which is smaller than the large area to be carried out.

With this configuration, images can be formed on the imaging surface of the image pickup device without the images deviating from the imaging surface of the image pickup device even if the insertion position of the insertable optical element is set on the side of an optical axis of the main optical system which is closer to the removed position in the inserting/removing direction.

It is desirable for the imaging device to include a light-shielding plate which covers the second photographing aperture when the insertable optical element is positioned in the removed position.

It is desirable for the insertable optical element to be a prism.

It is desirable for each of the first reflecting member and the second reflecting member to be a prism.

It is desirable for the light-shielding plate to move with the insertable optical element.

It is desirable for the imaging device to be incorporated in a mobile electronic device.

It is desirable for the mobile electronic device to include an outward-facing camera window and an inward-facing camera window, the imaging device being installed in the mobile electronic device with the first photographing aperture and the second photographing aperture facing the outward-facing camera window and the inward-facing camera window, respectively.

According to the present invention, a small imaging device equipped with an insertable optical element is achieved, wherein the imaging direction is switched between the first imaging direction via the first photographing aperture and the second imaging direction via the second photographing aperture and wherein the amount of movement of the insertable optical element is small.

The present disclosure relates to subject matter contained in Japanese Patent Application No. 2007-294057 (filed on Nov. 13, 2007) which is expressly incorporated herein by reference in its entirety.

BRIEF DESCRIPTION OF THE DRAWINGS

The present invention will be described below in detail with reference to the accompanying drawings in which:

FIG. 10 is a diagram showing the difference in usage area on the imaging surface of the image sensor, installed in the first embodiment of the imaging unit, between the outward-facing camera mode and the inward-facing camera mode;

FIG. 11 is a diagram showing another embodiment in which the aspect (length-to-width) ratio of the imaging surface of the image sensor in the inward-facing camera mode is reverse to that of the imaging surface of the image sensor shown in FIG. 10;

FIG. 15 is a cross sectional view taken along the XV-XV line shown in FIG. 14, showing a state where the sub-prism is inserted into an optical path of the main optical system.

DESCRIPTION OF THE PREFERRED EMBODIMENTS

Figure 1:
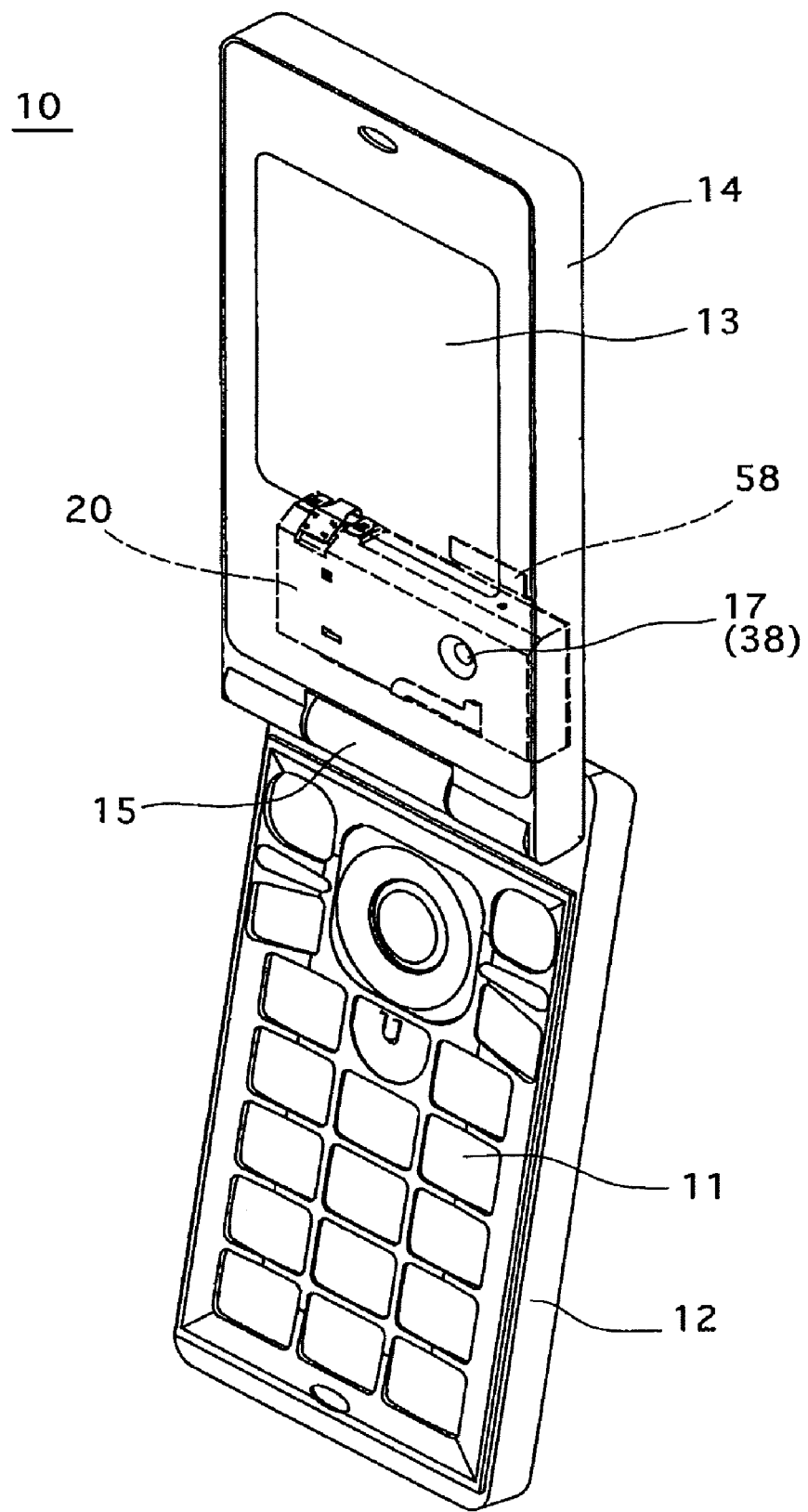
FIG. 1 is a perspective view of a folding type of mobile phone in which an imaging unit according to the present invention is incorporated, showing a fully open state (unfolded state) of the mobile phone.
Figure 2:
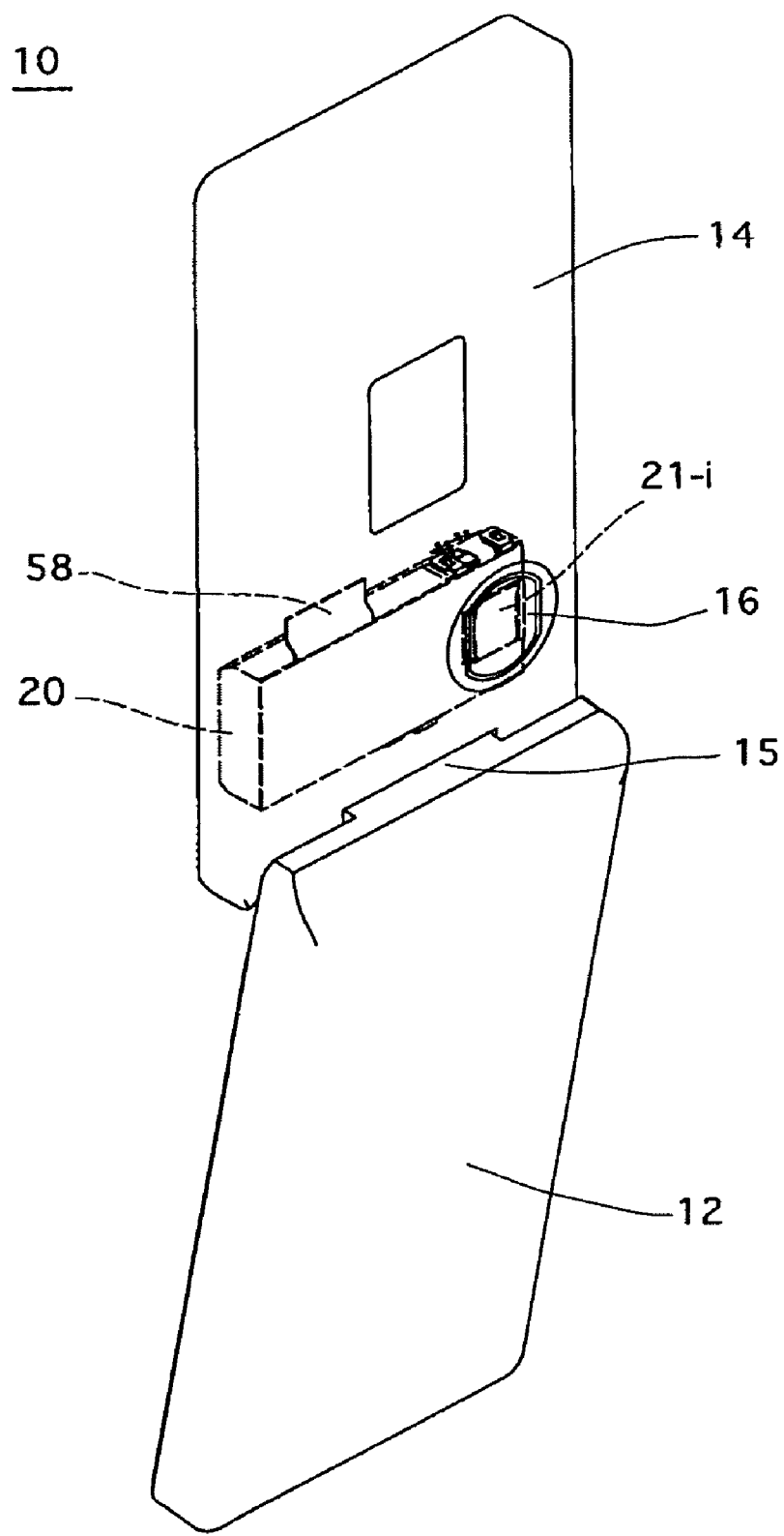
FIG. 2 is a perspective view of the mobile phone shown in FIG. 1, viewed from the other side of the mobile phone shown in FIG. 1.

A mobile phone (cellular phone) 10 shown in FIGS. 1 and 2 which is equipped with an outward-facing camera (main camera) and an inward-facing camera (sub-camera) is a folding type which is provided with a foldable housing including an operational portion 12 and a display portion 14, and is further provided between the operational portion 12 and the display portion 14 with a hinge 15. The operational portion 12 and the display portion 14 are hingedly connected with each other via the hinge 15 to be allowed to rotate relative to each other about the axis of the hinge 15 so that the mobile phone 10 can change between an operating state (fully open state/unfolded state) shown in FIGS. 1 and 2, in which the operational portion 12 and the display portion 14 are fully opened, and a folded state (not shown) in which the mobile phone 10 is folded so that the operational portion 12 and the display portion 14 overlay each other. The operational portion 12 is provided with a plurality of operational keys 11 such as numerical keys and other keys such as function keys, and the display portion 14 is provided with a liquid crystal display (LCD) 13, serving as a display device. The display portion 14 is provided, on the back thereof (outer surface of the display portion 14 that is exposed whether the mobile phone is a folded state or a fully open state) in the vicinity of the hinge 15, with an outward-facing camera window 16. On the other hand, the display portion 14 is provided, in the vicinity of the hinge 15 on the front side (the liquid crystal display 13 side) of the display portion 14 that faces the operational portion 12 when the mobile phone 10 is in the folded state, with an inward-facing camera window 17. The mobile phone 10 is provided, in the display portion 14 between the outward-facing camera window 16 and the inward-facing camera window 17, with an imaging unit (imaging module) 20. In the following descriptions of the imaging unit 20, the lengthwise direction of the liquid crystal display 13, the widthwise direction of the liquid crystal display 13 and the direction of the thickness of the display portion 14 are referred to as the vertical direction, the lateral direction and the depthwise direction, respectively. In addition, one side and the other side of the imaging unit 20 which face the outward-facing camera window 16 and the inward-facing camera window 17 are defined as the front side and the back side of the imaging unit 20, respectively.

Figure 6:
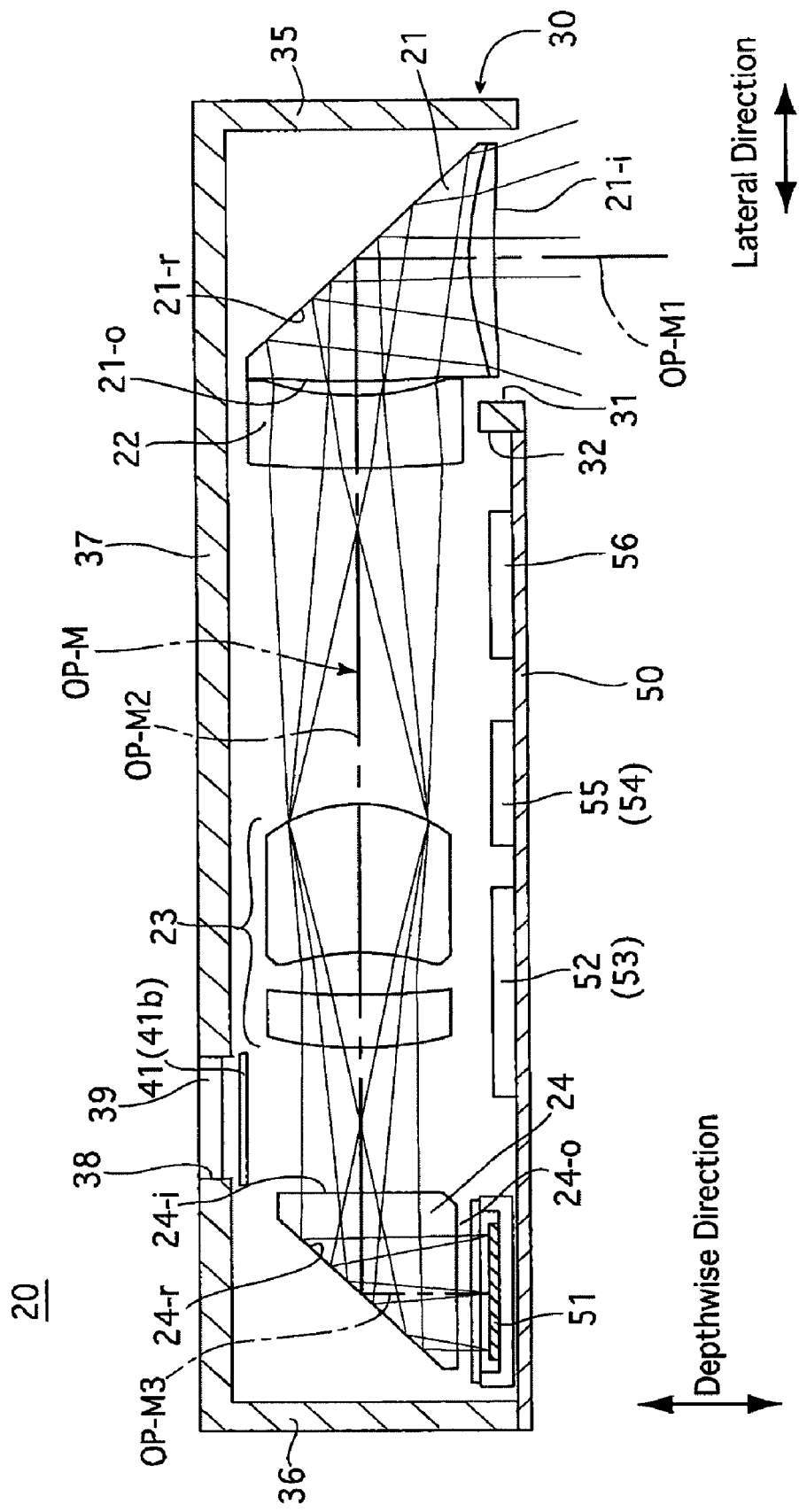
FIG. 6 is a cross sectional view taken along the VI-VI line shown in FIG. 5, showing a state where the sub-prism is removed from an optical path of the main optical system.
Figure 7:
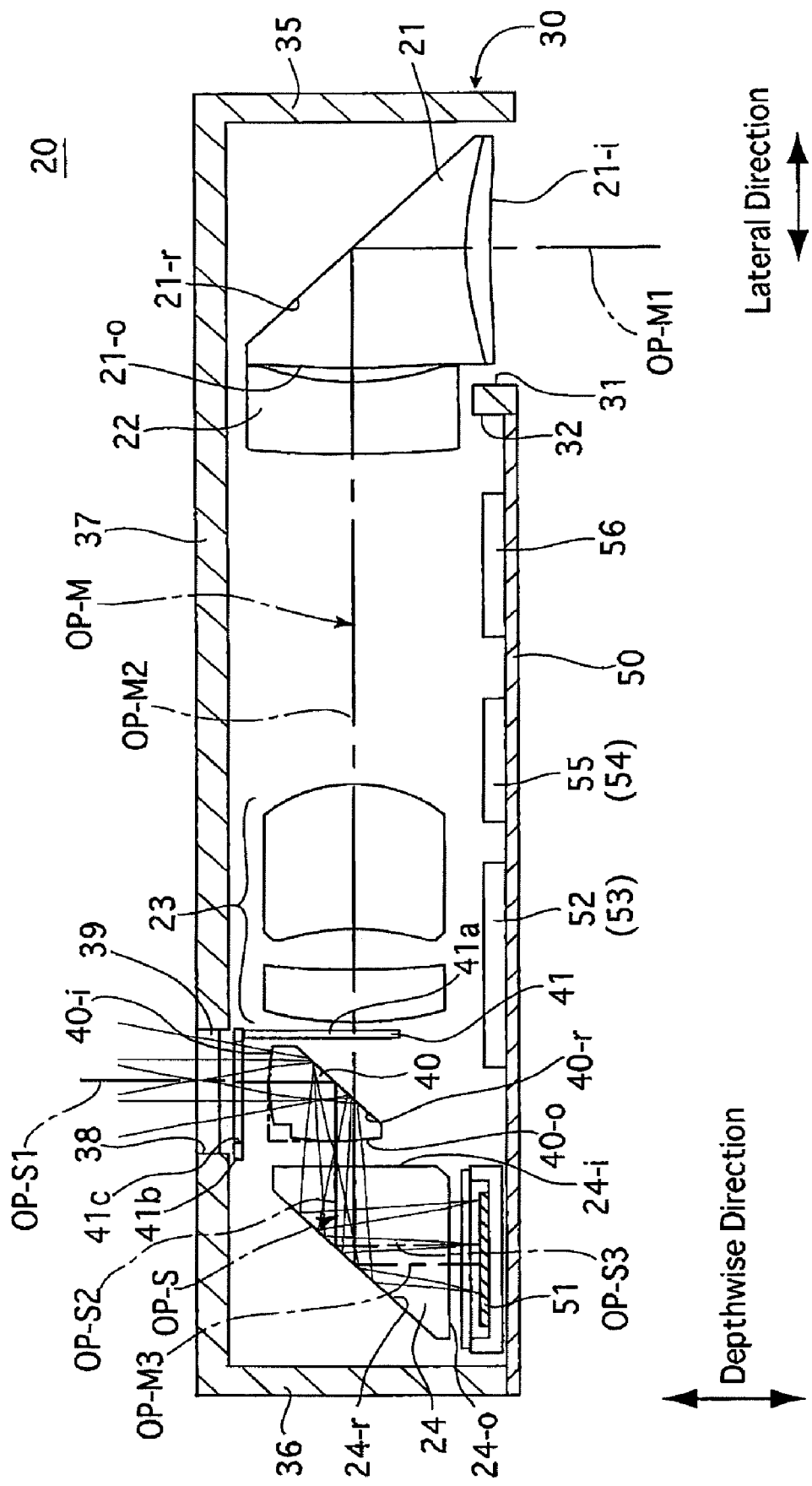
FIG. 7 is a cross sectional view of the first embodiment of the imaging unit in a state where the sub-prism is inserted into the optical path of the main optical system.

The imaging unit 20 is provided with a housing 30 formed as a box-shaped body which is elongated in the lateral direction. As shown in FIGS. 6 and 7, the housing 30 is provided, on the front side thereof that faces the outward-facing camera window 16, with a front opening (first photographing aperture) 31 and a substrate-fixing opening 32, and is further provided, around the front opening 31 and the substrate-fixing opening 32, with a pair of lateral walls 33 and 34 (see FIG. 5) and a pair of vertical walls 35 and 36. Additionally, the housing 30 is provided, in the back thereof that faces the inward-facing camera window 17, with a back wall 37 which closes the back of the housing 30. The pair of lateral walls 33 and 34 are substantially parallel to each other and the pair of vertical walls 35 and 36 are also substantially parallel to each other. The back wall 37 is positioned to face the front opening 31 and the substrate-fixing opening 32 and substantially orthogonal to both the pair of lateral walls 33 and 34 and the pair of vertical walls 35 and 36. The back wall 37 is provided with a back opening (second photographing aperture) 38 which is formed through the back wall 37 in the depthwise direction so that the inside and the outside of the housing 30 are communicatively connected to each other through the back opening 38. The imaging unit 20 is provided with a transparent member 39 which is fitted in the back opening 38 to be fixed thereto for protective and dust preventive purposes.

The imaging unit 20 is provided, in the housing 30 at a position adjacent to the vertical wall 35, with a first prism (first reflecting member) 21. Additionally, the imaging unit 20 is provided, in the housing 30 in the vicinity of the vertical wall 36, with a second prism (second reflecting member) 24 so that the second prism 24 is positioned apart from the first prism 21 in the lateral direction. The first prism 21 is a right-angle prism which is provided with an incident surface 21-$i$, an exit surface 21-$o$ and a reflecting surface 21-$r$. The first prism 21 reflects light incident from the incident surface 21-$i$ through the front opening 31 at a substantially right angle toward the exit surface 21-$o$ by the reflecting surface 21-$r$. The second prism 24 is a right-angle prism which is provided with an incident surface 24-$i$, an exit surface 24-$o$ and a reflecting surface 24-$r$. The second prism 24 reflects light incident on the incident surface 24-$i$ at a substantially right angle toward the exit surface 24-$o$ by the reflecting surface 24-$r$. The first prism 21 is installed in the housing 30 with the incident surface 21-$i$ being exposed outwardly through the front opening 31 and with the exit surface 21-$o$ being orientated toward the vertical wall 36. The second prism 24 is installed in the housing 30 with the incident surface 24-$i$ being orientated toward the exit surface 21-$o$ of the first prism 21 and with the exit surface 24-$o$ being orientated toward the substrate-fixing opening 32.

The imaging unit 20 is further provided in the housing 30 between the first prism 21 and the second prism 24 with a first lens group 22 and a second lens group 23. The second lens group 23 includes two lens elements as clearly shown in FIGS. 5, 6 and 7. The first lens group 22 is installed to face the exit surface 21-$o$ of the first prism 21 and the second lens group 23 is installed to face the incident surface 24-$i$ of the second prism 24. The back opening 38 is formed between the second lens group 23 and the second prism 24 in the lateral direction of the housing 30.

The first prism 21, the first lens group 22, the second lens group 23 and the second prism 24 constitute a main optical system for capturing images through the outward-facing camera window 16. Upon light being incident on the main optical system, light from the object side is incident on the incident surface 21-$i$ through the front opening 31 along an incident optical axis OP-M1, as shown in FIG. 6. The incident optical axis OP-M1 extends in the depthwise direction. The first prism 21 reflects the incident light by the reflecting surface 21-$r$ at a substantially right angle, and the light thus reflected by the reflecting surface 21-$r$ exits from the first prism 21 through the exit surface 21-$o$ and travels through the first lens group 22 and the second lens group 23 along an intermediate optical axis OP-M2 that extends in the lateral direction to be incident on the incident surface 24-$i$ of the second prism 24. The second prism 24 reflects the incident light toward the object side by the reflecting surface 24-$r$ at a substantially right angle so that the light thus reflected by the reflecting surface 24-$r$ exits from the second prism 24 through the exit surface 24-$o$ toward an image sensor (image pickup device) 51 along an exit optical axis OP-M3 that is substantially parallel to the incident optical axis OP-M1. Accordingly, the main optical system is configured as an optical system including the incident optical axis OP-M1, the intermediate optical axis OP-M2 and the exit optical axis OP-M3, which constitute a main optical axis OP-M bent in a substantially U-shape so as to extend from the front opening 31 to the image sensor 51.

The second lens group 23 is supported to be movable along the intermediate optical axis OP-M2 (in the lateral direction) in the housing 30. The main optical system is a zoom optical system in which the focal length is varied by moving the lens elements (the two lens elements shown in FIG. 5) of the second lens group 23 independently of each other along the intermediate optical axis OP-M2 by a lens drive motor 60 (see FIG. 9). Additionally, a focusing operation can be carried out by moving the lens elements of the second lens group 23 as one body along the intermediate optical axis OP-M2. It is optional as to which part of the main optical system is used as a zoom (power varying) lens group or a focusing lens group; for instance, as an alternative to the first embodiment of the imaging unit, both the first lens group and the second lens group can be moved to perform a power varying operation.

The imaging unit 20 is further provided between the second lens group 23 and the second prism 24 in the housing 30 with a sub-prism (insertable optical element/third reflecting member) 40 (see FIGS. 5 and 7) which can be inserted into and removed from a lateral optical path (intermediate optical path) of the main optical system. The sub-prism 40 is supported to be movable in the vertical direction in the housing 30. The sub-prism 40 is moved by a prism inserting/removing motor 61 conceptually shown in FIG. 9 between an insertion position (shown by a solid line in FIG. 5 and also shown in FIG. 7), in which the sub-prism 40 is positioned in an optical path between the second lens group 23 and the second prism 24, and a removed position (shown by a two-dot chain line in FIG. 5), in which the sub-prism 40 is removed from this optical path between the second lens group 23 and the second prism 24.

The sub-prism 40 is provided with an incident surface 40-$i$, a reflecting surface 40-$r$ and an exit surface 40-$o$. In the inserted state shown in FIG. 7, the sub-prism 40 is in the state where the incident surface 40-$i$ faces the transparent member 39 that is fitted in the back opening 38 of the housing 30 while the exit surface 40-$o$ faces the incident surface 24-$i$ of the second prism 24. Each of the incident surface 40-$i$ and the exit surface 40-$o$ is provided as a convex surface having a lens function. When the sub-prism 40 is in this inserted state, light which is incident on the incident surface 40-$i$ along a sub-incident optical axis OP-S1 from the back opening 38 side is reflected toward the exit surface 40-$o$ at a substantially right angle by the reflecting surface 40-$r$ to exit the exit surface 40-$o$ so as to be incident on the incident surface 24-$i$ of the second prism 24 along a sub-intermediate optical axis OP-S2. The sub-intermediate optical axis OP-S2 is substantially parallel to the intermediate optical axis OP-M2. The second prism 24 reflects the incident light, which is incident on the incident surface 24-$i$ along the sub-intermediate optical axis OP-S2, by the reflecting surface 24-$r$ at a substantially right angle so that the light thus reflected by the reflecting surface 24-$r$ exits from the second prism 24 through the exit surface 24-*o* toward the image sensor 51 along a sub-exit optical axis OP-S3 that is substantially parallel to the exit optical axis OP-M3. In the state where the sub-prism 40 is in the insertion position, the sub-prism 40 and the second prism 24 constitute a sub-optical system via which a photographing operation (image-capturing operation) is performed through the inward-facing camera window 17. Namely, the sub-incident optical axis OP-S1, the sub-intermediate optical axis OP-S2 and the sub-exit optical axis OP-S3 constitute a sub-optical axis OP-S of the sub-optical system which extends from the back opening 38 to the image sensor 51.

Figure 5:
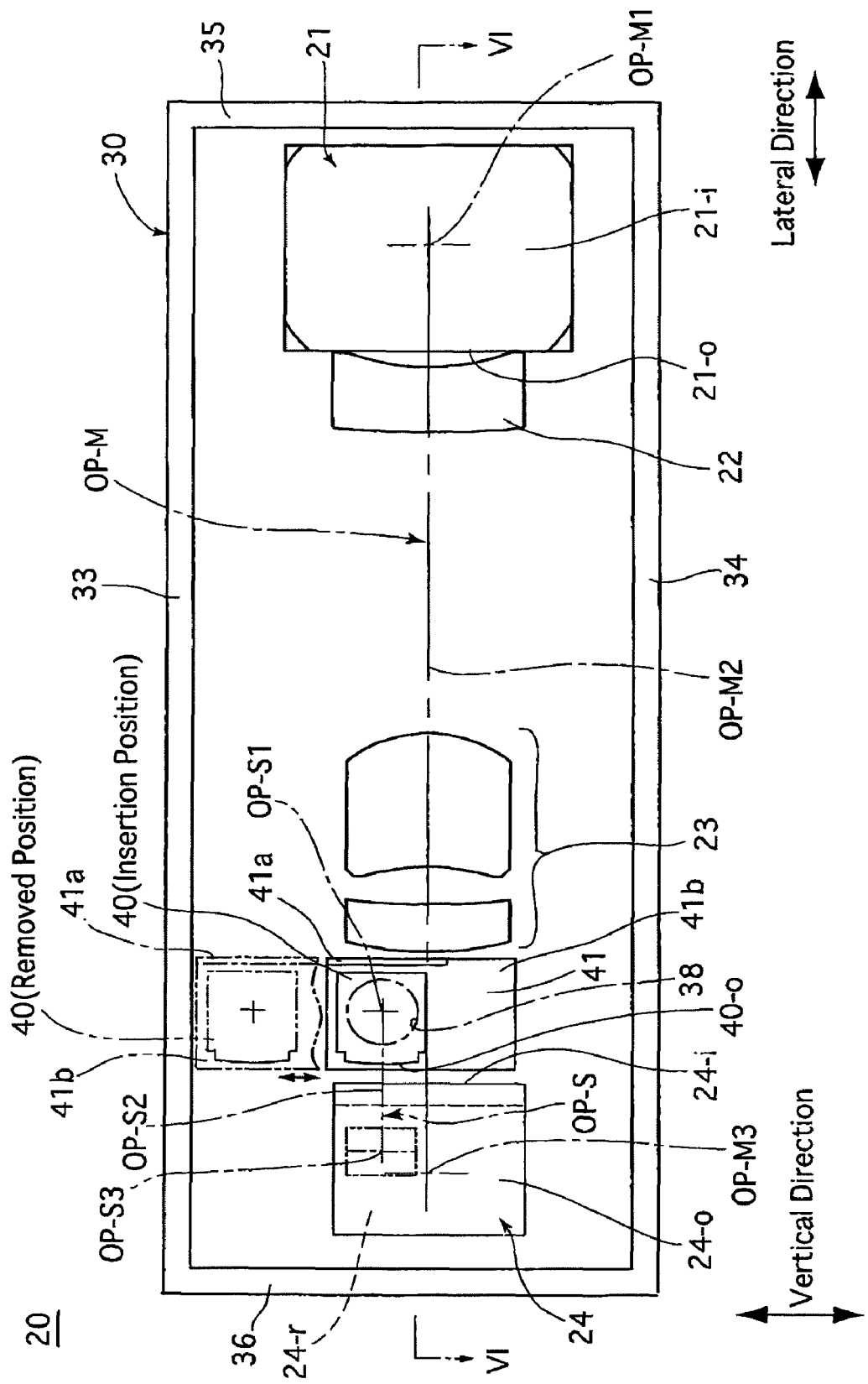
FIG. 5 is a front elevational view of the first embodiment of the imaging unit with the cover board removed.

As can be understood from FIG. 5, in the inserting/removing direction of the sub-prism 40 relative to the main optical system, i.e., in the vertical direction in the housing 30, the insertion position of the sub-prism 40 is set on the side of the intermediate optical axis OP-M2 of the main optical axis OP-M which is closer to the removed position of the sub-prism 40 (closer to the lateral wall 33). Additionally, as shown in FIG. 7, in the depthwise direction in the housing 30, the sub-prism 40 is set on the side of the intermediate optical axis OP-M2 of the main optical axis OP-M which is closer to the back wall 37. Due to this arrangement of the sub-prism 40, the center of the optical path of the sub-optical system (i.e., the sub-optical axis OP-S) is offset away from the center of the optical path of the main optical system (i.e., the main optical axis OP-M). More specifically, the sub-optical axis OP-S of the sub-optical system has been offset toward the lateral wall 33 (i.e., shifted upwardly) from the main optical axis OP-M of the main optical system by the setting of the position of the sub-prism 40 in the vertical direction (see FIG. 5). In addition, according to the setting of the position of the sub-prism 40 in the depthwise direction, the intermediate optical path of the sub-optical system that extends along the sub-intermediate optical axis OP-S2 has been offset toward the back wall 37 from the intermediate optical axis OP-M2 of the main optical system (see FIG. 7) while the exit optical path of the sub-optical system that extends along the sub-exit optical axis OP-S3 has been shifted toward the lateral wall 35 from the exit optical axis OP-M3 of the main optical system (see FIG. 7).

Figure 12:
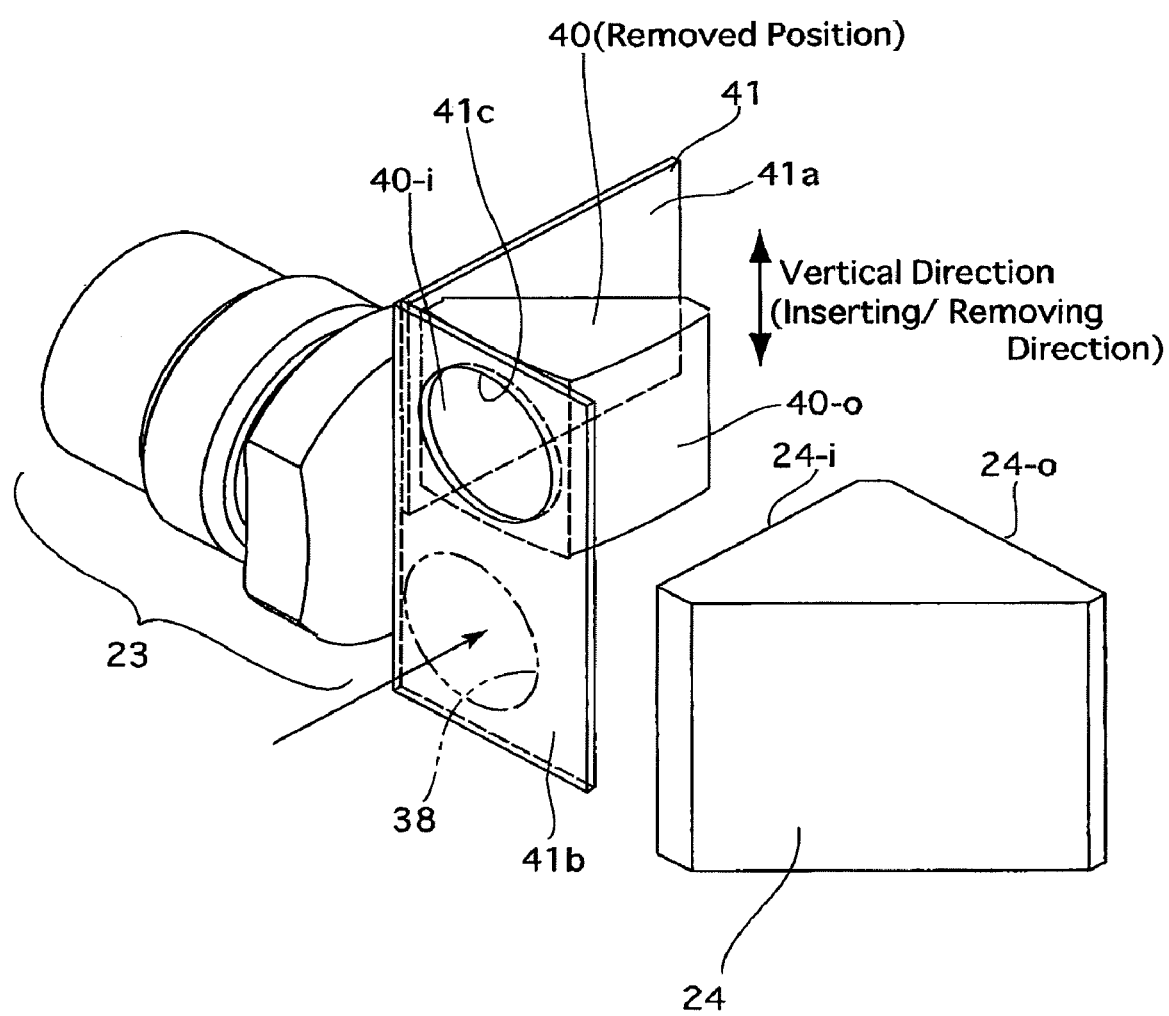
FIG. 12 is a perspective view of optical elements of the first embodiment of the imaging unit, showing a state of the light-shielding plate with the sub-prism removed from the optical path between the second lens group and the second prism.
Figure 13:
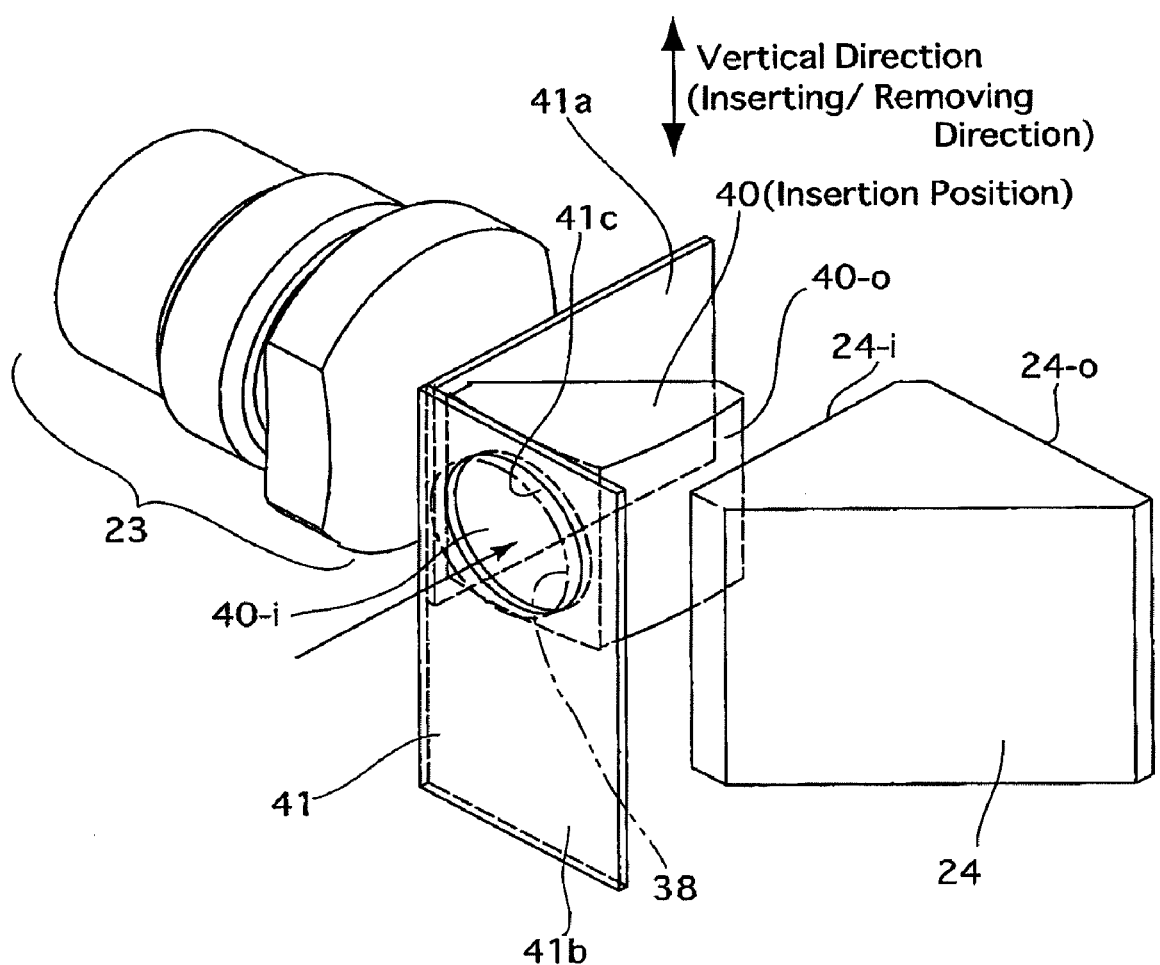
FIG. 13 is a view similar to that of FIG. 12, showing a state of the light-shielding plate with the sub-prism inserted into the optical path between the second lens group and the second prism.

The imaging unit 20 is provided in the housing 30 with a light-shielding plate 41 which is integrally supported with the sub-prism 40 so as to move therewith. As shown in FIGS. 12 and 13, the light-shielding plate 41 is provided with a first wall portion 41*a* and a second wall portion 41*b* and has the shape of a letter L in cross section. The first wall portion 41*a* is positioned between the second lens group 23 and the sub-prism 40 in a direction along the intermediate optical axis OP-M2 of the main optical axis OP-M, and the second wall portion 41*b* is substantially parallel to the intermediate optical axis OP-M2 of the main optical axis OP-M and positioned between the sub-prism 40 and the back wall 37 in the depthwise direction in the housing 30. An opening 41*c* is formed through the second wall portion 41*b* to face the incident surface 40-*i* of the sub-prism 40. In the inserting/removing direction of the sub-prism 40, i.e., in the vertical direction of the housing 30, the length of the first wall portion 41*a* substantially corresponds to the height of the sub-prism 40, whereas the length of the second wall portion 41*b* is longer than the height of the sub-prism 40; i.e., the second wall portion 41*b* extends up to a position so as to cover the back opening 38 in the state shown in FIG. 12, in which the sub-prism 12 is in the removed position.

When the sub-prism 40 is in the removed position, the back opening 38 is covered (light-shielded) by the second wall portion 41*b* of the light-shielding plate 41 as shown in FIG. 12 to thereby prevent light which may enter an optical path of the main optical system through the back opening 38 from entering the optical path of the main optical system. At this time, the first wall portion 41*a*, together with the sub-prism 40, is positioned out of the optical path of the main optical system upwardly, so that the first wall portion 41*a* shields no light which passes through the main optical system. On the other hand, when the sub-prism 40 is moved to the insertion position as shown in FIG. 13, the light-shielding plate 41 moves with the sub-prism 40 in the inserting direction thereof so that the first wall portion 41*a* faces the exit surface of the second lens group 23 to intercept light from the main optical system, and simultaneously, the opening 41*c* is positioned immediately behind the back opening 38 to allow the light from the back opening 38 to be incident on the incident surface 40-*i* of the sub-prism 40.

Figure 8:
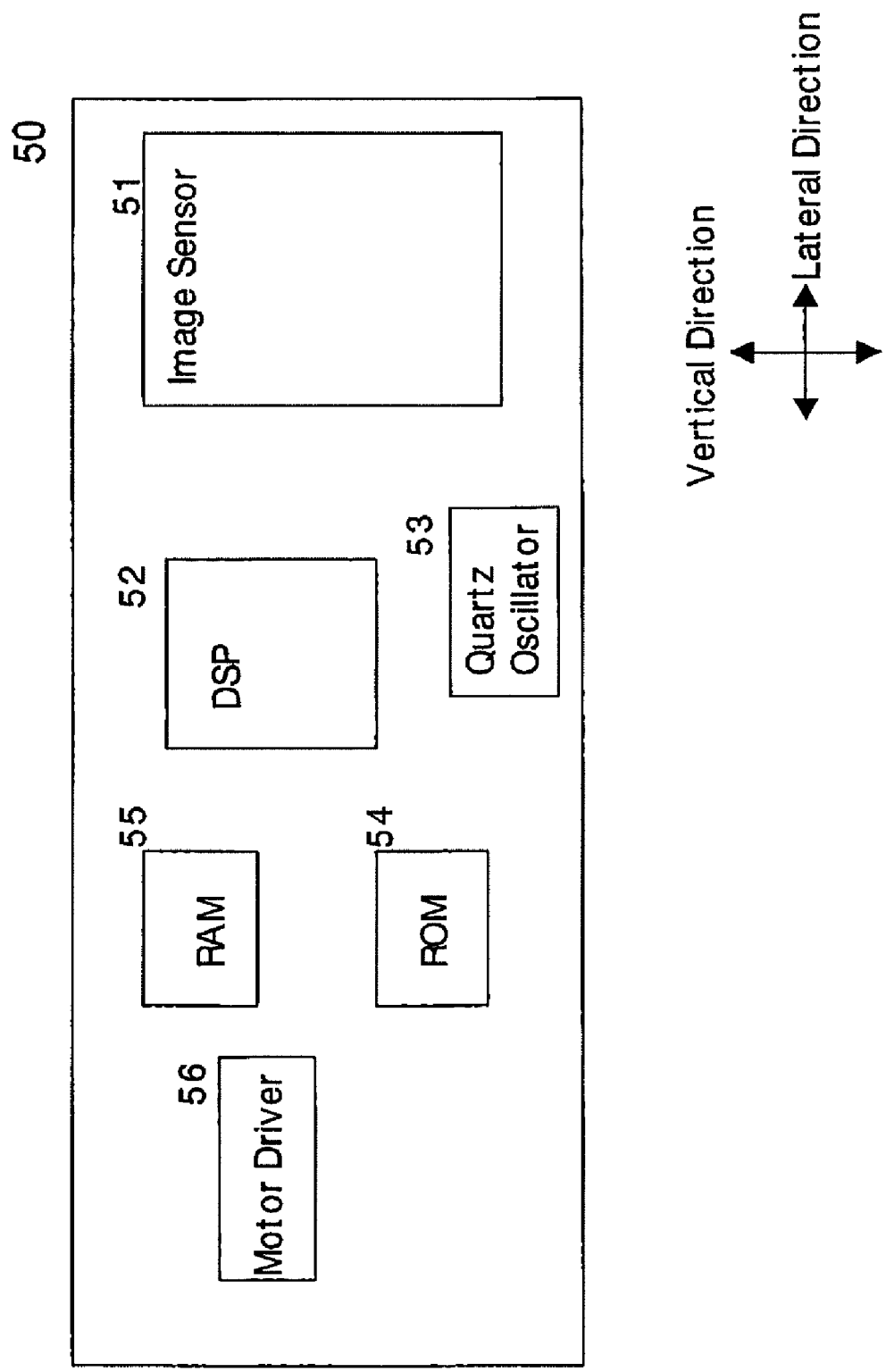
FIG. 8 is a simplified front view of the cover board fixed to the housing of the first embodiment of the imaging unit, showing the layout of the electronic circuit parts contained on the cover board.

The imaging unit 20 is completed by fixing a cover board (wall) 50 to the housing 30 so as to close the substrate-fixing opening 32 after the above described elements are installed to the housing 30. As shown in FIG. 8, the cover board 50 is provided with electronic circuit parts such as the image sensor 51, a digital signal processor (hereinafter referred to as DSP) 52, a quartz oscillator 53, a read-only memory (hereinafter referred to as ROM) 54, a random-access memory (hereinafter referred to as RAM) 55 and a motor driver 56, which are all mounted on a rectangular substrate elongated in the lateral direction of the housing 30.

Figure 9:
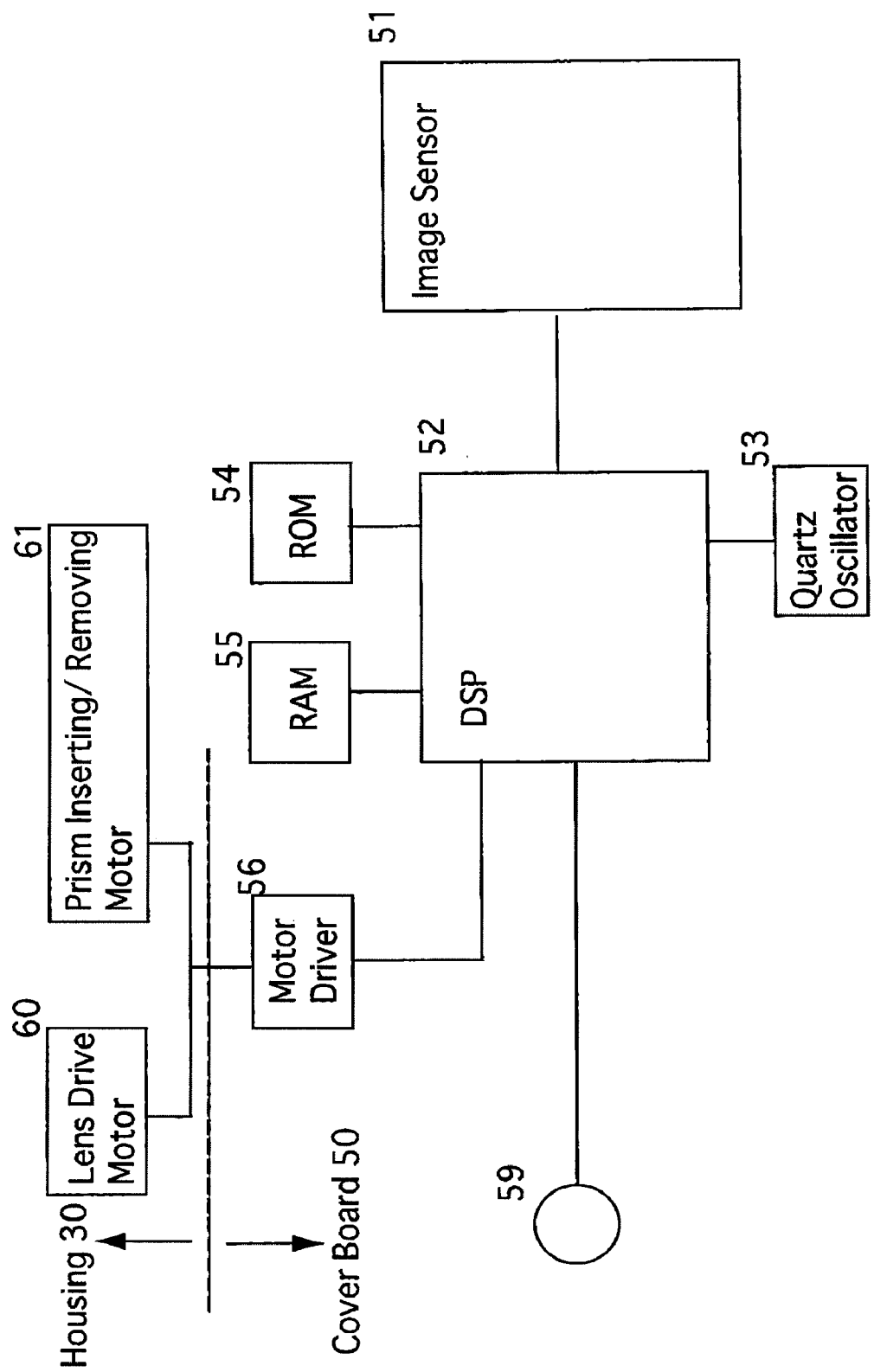
FIG. 9 is a block diagram of the electronic circuit parts contained on the cover board shown in FIG. 8, showing the connection for control between the electronic circuit parts.

FIG. 9 shows the connection for control between electronic circuit parts in the imaging unit 20. The image sensor 51 is a conventional type such as a CCD or CMOS image sensor that converts light incident on the imaging surface (light-receiving surface) thereof into an electrical signal to output this signal. In live view mode in which live images (live preview) are displayed on the liquid crystal display 13, the signal from the image sensor 51 is sequentially read out therefrom by control of the DSP 52 to be processed by the DSP 52 therein in order to be generated as a signal (YUV signal) capable of being visually indicated by display elements of the liquid crystal display 13. When a photograph is taken to capture a still image, all the pixel signals (pixel data) are read out of the image sensor 51 in accordance with a control signal output from the DSP 52 to be processed by the DSP 52 therein, compressed in a predetermined format such as JPEG by the DSP 52, and output from the DSP 52 as an image signal capable of being stored into an external memory (e.g., a removable memory card). The reference numeral 59 shown in FIG. 9 represents an external interface via which the DSP 52 outputs the image signal. The DSP 52 also controls the operation of the lens drive motor 60 and the operation of the prism inserting/removing motor 61 via the motor driver 56. A program for operating the DSP 52 is stored in the ROM 54. Upon startup of the power of the mobile phone 10, the DSP 52 reads in this program from the ROM 54 to perform a series of startup processes, and processes the signal output from the image sensor 51 to output object images (live preview), which visually informs the user that the mobile phone 10 has entered a ready-to-photograph state. The RAM 55 is used as a temporary storage in order for the DSP 52 to process the image signal input from the image sensor 51. The quartz oscillator 53 outputs a timing signal with a preset clock speed.

As shown in FIGS. 6 and 7, upon the cover board 50 being fixed to the housing 30 so as to close the substrate-fixing opening 32, the imaging surface (light receiving surface) of the image sensor 51 is positioned to face the exit surface 24-*o* of the second prism 24. In other words, the image sensor 51 is positioned on the exit optical axis OP-M3 of the main optical axis OP-M and the sub-exit optical axis OP-S3 of the sub-optical axis OP-S. When the cover board 50 is fixed to the housing 30, the fixing position of the cover board 50 relative to the housing 30 is finely adjusted so that an object image formed through the main optical system and an object image formed through the sub-optical system are precisely formed on the imaging surface of the image sensor 51. The cover board 50 is fixed to the housing 30 by, for example, adhesive.

Figure 3:
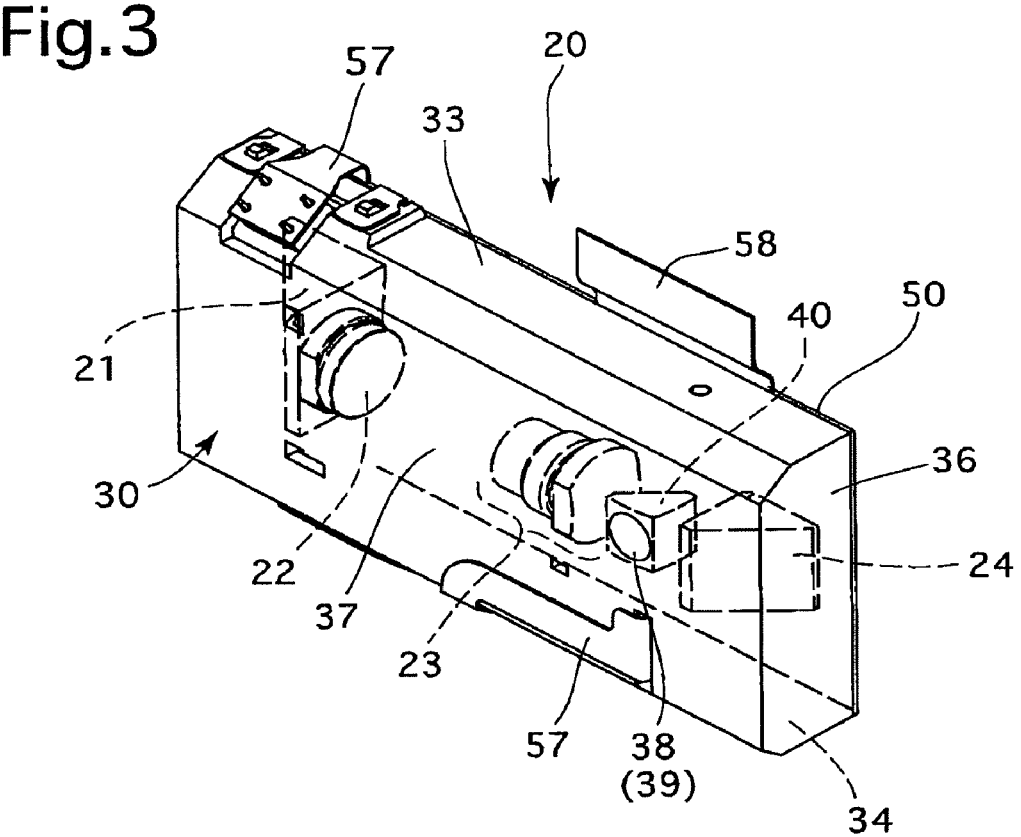
FIG. 3 is a perspective view of a first embodiment of the imaging unit, showing the outward appearance thereof, and also showing the interior of the imaging unit to show an imaging optical system included in the imaging unit by dashed lines.
Figure 4:
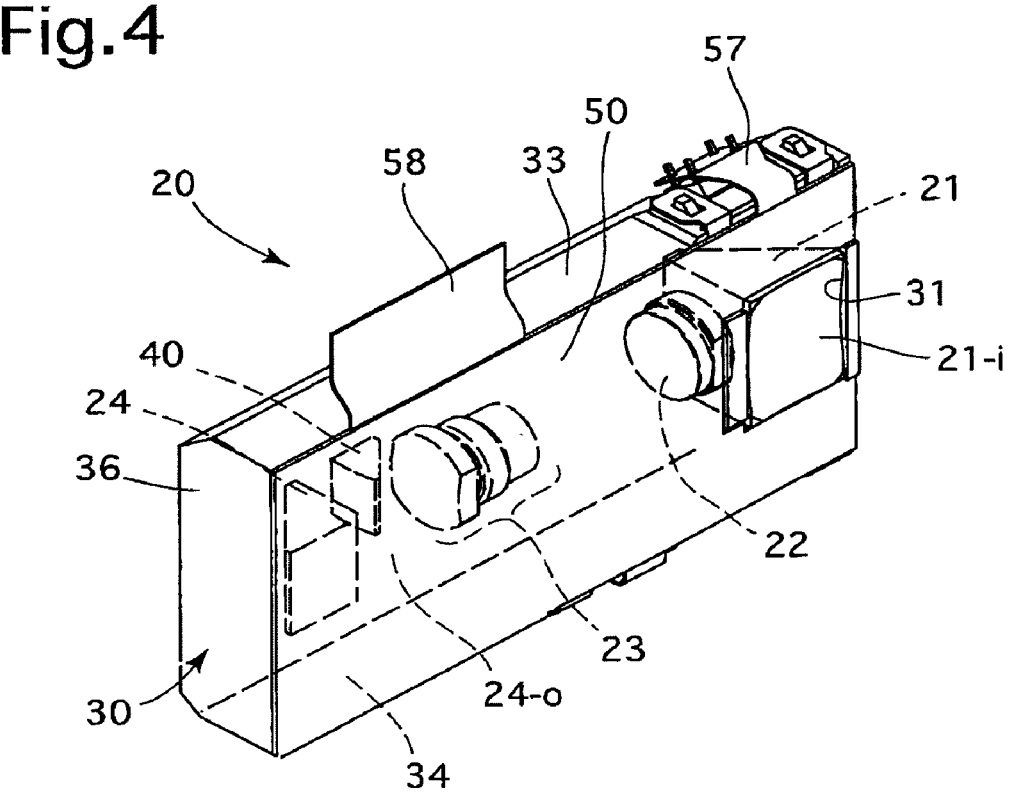
FIG. 4 is a perspective view of the imaging unit, viewed from the other side (front side) of the imaging unit shown in FIG. 3.

When the cover board 50 is fixed to the housing 30, a motor drive flexible PCB (printed circuit board) 57 (see FIG. 3) which extends from the cover board 50 is connected to terminals of the lens drive motor 60 and the prism inserting/removing motor 61. The motor drive flexible PCB 57 is connected to the motor driver 56, so that the operations of the lens drive motor 60 and the prism inserting/removing motor 61 can be controlled by the motor driver 56 upon completion of the installation of the cover board 50 to the housing 30.

The imaging unit 20 in a completed state thereof after the cover board 50 and the housing 30 have been joined to each other is in the shape of a box including front and rear light incident portions (optical apertures), i.e., the front opening 31, through which the incident surface 21-i of the first prism 21 is exposed outwardly, and the back opening 38, toward which the incident surface of the sub-prism 40 in the insertion position faces. The imaging unit 20 is installed in the display portion 14 of the mobile phone 10 so that the front opening 31 is positioned immediately behind the outward-facing camera window 16 and that the back opening 38 is positioned immediately behind the inward-facing camera window 17 as shown in FIGS. 1 and 2. In this installation operation, an image-signal flexible PCB (printed circuit board) 58 which extends from the cover board 50 is connected to a control circuit (not shown) provided in the mobile phone 10.

The control circuit of the mobile phone 10 sends a control signal which is input via an operating device such as the operational keys 11 to the imaging unit 20 via the image-signal flexible PCB 58. This control signal can be, e.g., a photographing-operation execution signal, a live-view (image-indication) execution signal, a zooming operation signal or a camera switching signal. Upon inputting the photographing-operation execution signal, the imaging unit 20 carries out a photographing operation including the above-described focusing operation (in which the second lens group 23 is driven by the lens drive motor 60), and the imaging unit 20 sends an image signal which has been processed and formatted by the DSP 52 to be stored in memory to the control circuit via the image-signal flexible PCB 58. Upon inputting the live-view execution signal, the imaging unit 20 sends an image signal (YUV signal) for on-screen indication which has been processed by the DSP 52 to the control circuit via the flexible PCB 58. In addition, immediately after the imaging unit 20 inputs the zooming operation signal, the lens drive motor 60 is actuated via the motor driver 56 to change the focal length of the imaging optical system of the imaging unit 20. Additionally, power is also supplied to the imaging unit 20 via the flexible PCB 58.

The camera switching signal is for switching between an outward-facing camera mode using the main optical system and an inward-facing camera mode using the sub-optical system. The sub-prism 40 is in the aforementioned retracted position when the outward-facing camera mode is selected. When the inward-facing camera mode is selected, the prism inserting/removing motor 61 is actuated to move the sub-prism 40 to the aforementioned insertion position. When the sub-prism 40 is moved in the inserting/removing direction by the prism inserting/removing motor 61, the light-shielding plate 41 moves with the sub-prism 40.

In the present embodiment of the imaging unit 20, the main optical system and the sub-optical system each form an image on the imaging surface of a common (single) imaging sensor, i.e., the image sensor 51, and the operation of the image sensor 51 is controlled so that the usage area (the number of pixels to be used) changes according to selection of an optical system to be used between the main optical system and the sub-optical system. As shown in FIG. 10, the image sensor 51 is disposed so that the imaging surface thereof that is rectangular in shape is elongated vertically so that the aspect (length-to-width) ratio of the imaging surface of the image sensor 51 is four to three (4:3), and a high-pixel-resolution photographing operation using an area (large area) E1 for the main optical system (hereinafter referred to as a main area E1) is carried out in the outward-facing camera mode that uses the main optical system. The main area E1 substantially corresponds to the entire area of the imaging surface of the image sensor 51. On the other hand, in the inward-facing camera mode that uses the sub-optical system, a low-pixel-resolution photographing operation using an area E2 for the sub optical system (hereinafter referred to as a sub-area E2) is carried out. As shown in FIG. 10, the sub-area E2 is smaller than the main area E1. The sub-area E2 is a part of the imaging surface of the image sensor 51. Since the insertion position of the sub-prism 40 at the time the sub-optical system is used is offset from the center of the optical path (the intermediate optical axis OP-M2) of the main optical system in the vertical direction and the depthwise direction of the housing 30 as mentioned above, the sub-area E2 is offset from the center of the main area E1. The insertion position of the sub-prism 40 is determined so that the sub-area E2 is positioned within the periphery of the imaging surface of the image sensor 51.

In general, images (still images/video clips) captured by the inward-facing camera (sub-camera) of a mobile phone are basically indicated in a vertically-long indication manner to correspond to the vertically-elongated shape of the main display such as the liquid crystal display 13 of the mobile phone 10, and accordingly, the sub-area E2 shown in FIG. 10 has a vertically-elongated rectangular shape which is substantially similar to the shape of the liquid crystal display 13. As shown in FIG. 11, it is possible for the usage area of the imaging surface of the image sensor 51 to be formed into an area E2' for the sub optical system which is laterally-elongated rectangular in shape, and for a process of cutting a vertically-elongated image from a laterally-elongated captured image, or a process of obtaining a vertically-elongated image by rotating a laterally-elongated captured image, to be performed.

As described above, an imaging system of the mobile phone 10 which is equipped with an outward-facing camera function and an inward-facing camera function is completed by connecting the image-signal flexible PCB 58, which extends from the imaging unit 20, to the control circuit of the mobile phone 10. In the manufacturing process of the mobile phone 10, the imaging unit 20, which includes electronic circuit parts on the cover board 50 and is assembled as a module in advance, is simply installed in the display portion 14, and accordingly, no complicated operation for installation of the imaging unit 20 is necessary; hence, the mobile phone 10 is superior in workability of assembly thereof. From a similar point of view, the mobile phone 10 is superior in maintainability if the imaging unit 20 is repaired or replaced. In addition, the load of image processing is not applied to the control circuit of the mobile phone 10 since the image signal having been processed by the DSP 52 is output from the imaging unit 20.

In the imaging unit 20, the housing 30 that contains the image sensor 51 is provided on two sides thereof with the front opening 31 and the back opening 38 that face the outward-facing camera window 16 and the inward-facing camera window 17, respectively, and the main optical system for taking pictures through the front opening 31 and the sub-optical system for taking pictures through the back opening 38 are installed in a single housing, i.e., the housing 30. In addition, the image sensor 51 and the second prism 24 are used in both the outward-facing camera mode and the inward-facing camera mode. Accordingly, the imaging unit 20 is more compact in structure than a conventional type of imaging device in which an outward-facing camera (main camera) and an inward-facing camera (sub-camera) are installed independently; moreover, the manufacturing process can be simplified because the imaging unit 20 is made with less number of elements than such a conventional type of imaging device, so that a reduction in the production cost of the imaging unit 20 can be achieved as compared with the case where the main camera and the sub-camera are produced independently.

In addition, specifically in the present embodiment of the imaging unit 20, when the sub-prism 40 is inserted in the inward-facing camera mode, this insertion position of the sub-prism 40 is determined so that the sub-optical axis OP-S (the center of the optical path) of the sub-optical system is offset from the main optical axis OP-M of the main optical system toward the removed position of the sub-prism 40 in the prism-removing direction (the vertical direction of the housing 30). Therefore, the amount of movement of the sub-prism 40 from the removed position to the insertion position is smaller than in the case where the sub-prism 40 is moved until the center of the sub-prism 40 coincides with the main optical axis OP-M (the intermediate optical axis OP-M2), which contributes to miniaturization of the imaging unit 20. Since the aforementioned low-pixel-resolution photographing operation that uses the sub-area E2 (E2') on the image sensor 51 is carried out in the inward-facing camera mode, images captured by the inward-facing camera can be obtained in an appropriate manner so long as at least the sub-area E2 (E2') remains within the imaging surface of the image sensor 51 even if the sub-area E2 (E2') is not positioned at the center of the imaging surface of the image sensor 51. Accordingly, the imaging unit 20 can be made to serve as an inward-facing camera without any hindrance, and with no need to increase the amount of insertion movement of the sub-prism 40 to a degree so as to make the center of the optical path (the main optical axis OP-M) of the main optical system and the center of the optical path (the sub-optical axis OP-S) of the sub-optical system coincident with each other.

In the imaging device of the present invention, since the amount of movement of the insertable optical element in the inserting/removing direction with respect to the main optical system is made smaller, the remaining structure thereof can be determined as desired. For example, although the sub-prism 40 is installed on the side of the central optical path of the main optical system (the intermediate optical axis OP-M2 of the main optical axis OP-M) which is closer to the back wall 37 in the depthwise direction of the housing 30 in the above described embodiment of the imaging unit, it is possible for the sub-prism 40 to be installed so that the central portion (the sub-intermediate optical axis OP-S2 of the sub-optical axis OP-S) of the sub-prism 40 is coincident with the intermediate optical axis OP-M2 of the main optical axis OP-M in the depthwise direction of the housing 30.

Figure 14:
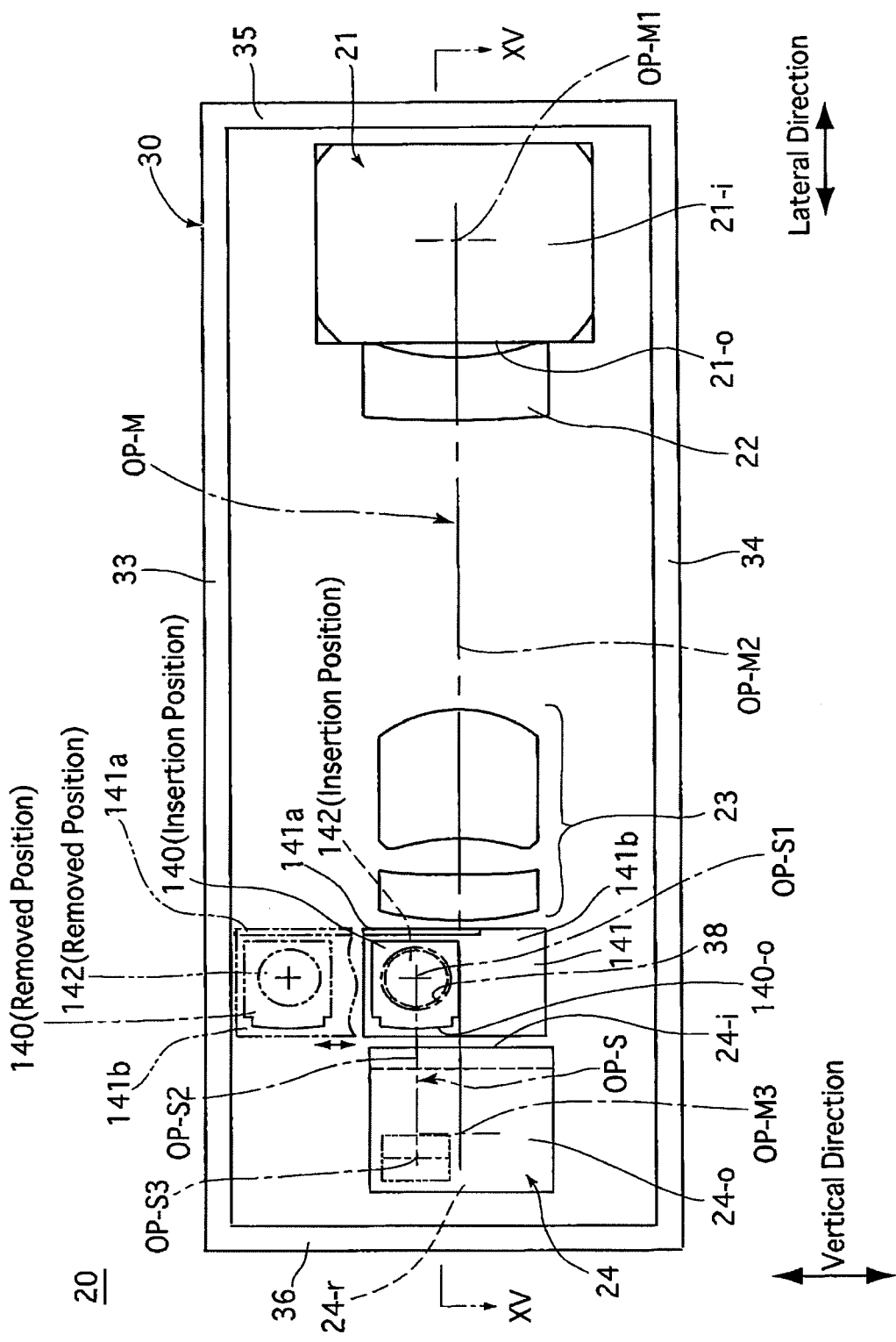
FIG. 14 is a front elevational view of the second embodiment of the imaging unit with the cover board removed.

Alternatively, the imaging unit 20 can be modified as shown in FIGS. 14 and 15. In the embodiment (second embodiment) shown in FIGS. 14 and 15, in the depthwise direction in the housing 30, a sub-prism 140 is installed on the side of the central optical path of the main optical system (the intermediate optical axis OP-M2 of the main optical axis OP-M) which is closer to the cover board 50 that is positioned on the front side of the imaging unit 20, and a sub-lens group 142 is installed between an incident surface 140-i of the sub-prism 140 and the back wall 37 (specifically the transparent member 39 that is fitted into the back opening 38 of the back wall 37). The sub-prism 140 and the sub-lens group 142 constitute an insertable optical element which is moved in the vertical direction of the housing 30 to be inserted into and removed from an optical path of the main optical system. A light-shielding plate 141 which moves with the sub-prism 140 and the sub-lens group 142 in the inserting/removing direction of the sub-prism 140 is installed in the housing 30. The light-shielding plate 141 is provided with a first wall portion 141a and a second wall portion 141b and has the shape of a letter L in cross section. The first wall portion 141a is substantially orthogonal to the intermediate optical axis OP-M2 of the main optical axis OP-M, and the second wall portion 141b is substantially parallel to the intermediate optical axis OP-M2 of the main optical axis OP-M. An opening 141c is formed through the second wall portion 141b to face the sub-lens group 142. The function of the light-shielding plate 141 is substantially the same as the function of the light-shielding plate 41 of the first embodiment of the imaging unit. The first wall portion 141a is positioned between the sub-prism 140 and the second lens group 23 when the sub-prism 140 and the sub-lens group 142 are positioned in the insertion position on an optical path of the main optical system, and the second wall portion 141b covers the back opening 38 when the sub-prism 140 and the sub-lens group 142 are positioned in the removed position that is out of the optical path of the main optical system.

The sub-prism 140 and the sub-lens group 142 move in the same manner as the sub-prism 40 of the first embodiment of the imaging unit in the inserting/removing direction. Namely, in the inward-facing camera mode, insertion position of a combination the sub-prism 140 and the sub-lens group 142 is determined so that the sub-optical axis OP-S (the center of the optical path) of the sub-optical system is offset from the main optical axis OP-M of the main optical system toward the removed position of the sub-prism 140 and the sub-lens group 142 (closer to the lateral wall 33). This arrangement makes it possible to achieve miniaturization of the imaging unit 20 and a reduction in the production cost of the imaging unit 20 by reducing the amount of movement of the sub-prism 140 and the sub-lens group 142. In addition, even with the sub-lens optical system which uses a lens group to enable aberration correction, e.g., like the sub-lens group 142, the thickness of the imaging unit 20 can be prevented from increasing by employing an arrangement such as shown in FIGS. 14 and 15.

Although the present invention has been discussed with reference to the above described embodiments and the accompanied drawings, the present invention is not limited solely to these particular embodiments; making various modifications to the imaging unit is possible without departing from the spirit or essential character thereof. For instance, although the image sensor 51 is supported by the cover board 50 on the front of the housing 30 so that the main optical system forms a U-shaped optical path in each embodiment of the imaging unit, it is possible for the image sensor to be supported by the vertical wall 36 so that the main optical system forms an L-shaped optical path.

Although the sub-prism that serves as an insertable optical element is inserted into and removed from an optical path by a motor in each embodiment of the imaging unit, it is possible for the insertable optical element to be inserted into and removed from an optical path manually or by an alternative moving device.

Additionally, the imaging unit according to the present invention can be incorporated in not only mobile phones but also any other type of mobile devices such as digital cameras (still-video cameras), digital camcorders (motion-video cameras), personal digital assistants (PDSs), personal computers and mobile computers.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging device comprising:
   a housing including a first photographing aperture and a second photographing aperture which are open toward opposite directions;
   an image pickup device provided in said housing;
   a main optical system which forms first incident light from said first photographing aperture onto an imaging surface of said image pickup device, said main optical system defining a main optical axis extending from said first photographing aperture to said image pickup device; and
   an insertable optical element which has a refractive power, and which is movable in an inserting/removing direction between an insertion position in an optical path of said main optical system and a removed position out of said optical path of said main optical system, wherein said insertable optical element constitutes at least a part of a sub-optical system which forms second incident light from said second photographing aperture onto said imaging surface of said image pickup device when said insertable optical element is positioned at said insertion position, said sub-optical system defining a sub-optical axis extending from said second photographing aperture to said image pickup device via said insertable optical element,
   wherein, when said insertable optical element is positioned in said insertion position, said sub-optical axis is offset from said main optical axis toward said removed position of said insertable optical element in said inserting/removing direction,
   wherein said image pickup device is mounted to a wall of said housing which includes said first photographing aperture, wherein said main optical system comprises:
   a first reflecting member which reflects said incident light from said first photographing aperture at a substantially right angle; and
   a second reflecting member which reflects said light reflected by said first reflecting member at a substantially right angle toward said image pickup device,
   wherein said insertable optical element includes a third reflecting member which is inserted into and removed from an intermediate optical path of said main optical system between said first reflecting member and said second reflecting member, and said third reflecting member reflects said incident light from said second photographing aperture toward said second reflecting member when said third reflecting member is inserted in said intermediate optical path of said main optical system, and
   wherein said inserting/removing direction of said insertable optical element is orthogonal to a plane defined by an intermediate optical axis of said main optical axis that extends from said first reflecting member to said second reflecting member and an exit optical axis of said main optical axis that extends from said second reflecting member to said image pickup device.

2. The imaging device according to claim 1, wherein, when a photographing operation is performed with said incident light via said first photographing aperture, with said insertable optical element being positioned in said removed position, a high-pixel-resolution photographing operation using a large area of said imaging surface of said image pickup device is carried out, and
   wherein, when a photographing operation is performed with said incident light via said second photographing aperture, with said insertable optical element being positioned in said insertion position, a low-pixel-resolution photographing operation using an area of said imaging surface of said image pickup device which is smaller than said large area is carried out.

3. The imaging device according to claim 1, further comprising a light-shielding plate which covers said second photographing aperture when said insertable optical element is positioned in said removed position.

4. The imaging device according to claim 3, wherein said light-shielding plate moves with said insertable optical element.

5. The imaging device according to claim 1, wherein said insertable optical element comprises a prism.

6. The imaging device according to claim 1, wherein each of said first reflecting member and said second reflecting member comprises a prism.

7. The imaging device according to claim 1, wherein said imaging device is incorporated in a mobile electronic device.

8. The imaging device according to claim 7, wherein said mobile electronic device comprises an outward-facing camera window and an inward-facing camera window, said imaging device being installed in said mobile electronic device with said first photographing aperture and said second photographing aperture facing said outward-facing camera window and said inward-facing camera window, respectively.

9. The imaging device according to claim 1, wherein immediately before said first incident light or said second incident light is incident on said image pickup device, said first incident light or said second incident light is arranged to progress in an optical element having no refractive power which commonly constitutes a part of said main optical system and said sub-optical system.

10. The imaging device according to claim 9, wherein said optical element having no refractive power comprises a prism.

* * * * *